United States Patent [19]

Kelch et al.

[11] 3,716,700
[45] Feb. 13, 1973

[54] INSTRUMENT FOR AUTOMATICALLY MAKING EVALUATIONS FROM RECORDING CHARTS

[75] Inventors: Heinz Kelch, Buchenberg; Josef Krickl, Bad Durrheim; Eduard Schuh; Siegfried Spauszus, both of Villingen, all of Germany

[73] Assignee: Kienzle Apparate GmbH, Villingen, Germany

[22] Filed: Jan. 26, 1972

[21] Appl. No.: 220,994

[30] Foreign Application Priority Data

Jan. 30, 1971 Germany...................P 21 04 351.6

[52] U.S. Cl. ............................................235/61.6 A
[51] Int. Cl. ..................................................G06k 11/00
[58] Field of Search......250/219 DD, 231 R, 231 SE; 235/61.11 E, 61.6 A, 61.6 B, 92 MT, 92 CV; 340/347 AD

[56] References Cited

UNITED STATES PATENTS

| | | | |
|---|---|---|---|
| 2,527,469 | 10/1950 | Vernon et al.....................235/92 MT |
| 3,549,897 | 12/1970 | Blake.............................235/61.12 N |
| 3,655,948 | 4/1972 | Spauszus.........................235/61.9 R |

Primary Examiner—Daryl W. Cook
Attorney—Michael S. Striker

[57] ABSTRACT

An apparatus has a rotating table which rotates at a predetermined speed. A tachograph chart having wide and narrow beam recordings as well as sawtooth type recordings recorded in adjacent tracks is placed on the rotating table. A scanning station has a plurality of photo diodes arranged in a direction perpendicular to the tracks, the photo diodes being arranged adjacent to each other in a row whose length dimension is greater than the width of any recording and is movable so it can be positioned opposite any recording to be evaluated. A motor drives the rotating table at the predetermined speed and controls a pulse generator to thereby cause the latter to generate time pulses having a frequency correlated to the speed of the motor. Three logic circuits, all connected to the scanning station and arranged to recognize narrow and wide beam recordings and sawtooth type recordings respectively, are connected to counters, the time pulses being directed to selected counters to provide an indication of the engine off, on and driving times and suitable signals are transmitted to a distance counter to register the total distance travelled.

25 Claims, 4 Drawing Figures

INSTRUMENT FOR AUTOMATICALLY MAKING EVALUATIONS FROM RECORDING CHARTS

BACKGROUND OF THE INVENTION

The invention involves an instrument for automatically making evaluations from diagram disks or charts of data which is in the form of inscriptions or recordings.

It is known that recording instruments or tachographs built into motor vehicles can record during driving not only velocity recordings but also at least one pure time recording on a chart, e.g. in the form of beam recordings. Further, such recording instruments can also record sawtooth type recordings on another track which record the driven distance, e.g. the number of kilometers driven.

Beam recordings are recorded by connecting the writing instrument to a vibrating mass or coupling it to a rotating shaft and driving it thereby, the amplitude being limited to correspond to the desired recording width. By limiting the width in such a manner, it is assured that the recordings lie within tracks having predetermined widths. The zigzag registration lines are so densely placed adjacent to one another that the resulting impression appears as a wide uninterrupted recording or beam in a recorded track in the direction of motion of the record carrier. Beam recordings have the large advantage, that the operating and rest times, or respectively the driving and stop times can, with the help of a time scale printed on the record carrier, be recognized due to variations of the beam width so that a simple estimated evaluation of the drawing is possible.

More is often required from a chart, however, namely, that it not only show whether the vehicle operates or drives, but also who operates or drives it, which stop times are only for the purpose of traffic lights and which stop times are for loading or unloading. These conditions can generally be fulfilled by utilizing different recorded widths. Evaluation of an individual registration time, i.e., the determination which driver has driven for how long and which time is required for loading and unloading is, however, difficult by visual evaluation.

According to the hereto known evaluation methods, the diagram is first magnified and the registration time is, with the help of the printed time scale, visually counted or analyzed. This work requires not only great expense in terms of personnel, but can also result in subjective interpretation errors which cannot be totally reduced.

A sawtooth type recording is made by a recording instrument, whose movement is dependent on an odometer or mileage counter which is displaced during a fixed travel distance in one direction and then during a further equal distance is displaced in the opposite direction. In this manner, the driven distance is shown. From one reversal point or peak of the sawtooth recording to the next represents a fixed driven distance (usually 5 kilometers).

The hitherto evaluating procedure was that the individual sawtooth peaks were counted and multiplied by five. Also by this approach, subjective evaluations errors could naturally not be removed. Also, this type of evaluation required a proportionately large expenditure of time.

It is also, however, already known to automatically evaluate such recordings. By one such instrument, beam diagrams having different width recordings are recognized and evaluated, in which a readout beam sweeps or scans the beam recording in a direction perpendicular to the direction of movement of the diagram chart with a proportionately large frequency. The scanning station recognizes the width through simultaneous recognition of the distances between the light-dark pulses and the dark-light pulses and determines therewith, to which counter to transmit the time pulses which are made available by the driver of the chart. Recognition of sawtooth type distance recordings is, however, not possible with such an apparatus.

However, another automatic evaluation instrument is known, which can evaluate such sawtooth type distance recordings. The sawtooth type recording is moved past two stationary scanning points, these being provided on each side of an imaginary center line of the sawtooth recording. By the passage of the recording, two pulses are generated one after another at each scanning point, between which a reversing point or peak of the recording is found. One of the two pulses generated at each peak is utilized for summing up the peaks at each scanning point. The sensing of the beginning and the end in such a distance recording presents difficulties with such instruments and makes the evaluation less accurate. Additionally, with such an instrument, beam recordings cannot be recognized and evaluated.

SUMMARY OF THE INVENTION

Accordingly, it is an object of the present invention to provide an apparatus for automatically evaluating different recordings recorded along tracks of a diagram chart which does not have the disadvantages known in the prior art.

It is another object of the present invention to provide an apparatus for automatically evaluating different recordings recorded along tracks of a diagram chart which is simple in construction and economic to manufacture and which quickly and reliably evaluate such recordings.

It is still another object of the present invention to provide an apparatus for automatically evaluating different recordings recorded along tracks of a diagram chart which can recognize and evaluate both beam recordings and sawtooth type recordings.

It is a further object of the present invention to provide an apparatus for automatically evaluating different recordings recorded along tracks of a diagram chart which can recognize beam recordings and sawtooth type recordings with one scanning station.

According to the present invention an apparatus for automatically evaluating different recordings recorded along tracks of a diagram chart comprises carrier means for supporting the diagram chart. Scanning means are provided for scanning said recordings along said tracks. Drive means are provided for moving at least one of said diagram carrier means and said scanning means relative to the other at a predetermined speed, said scanning means having a plurality of sensing means arranged perpendicularly to said tracks so that each track is sensed by at least some of said plurality of sensing means. Also, a plurality of electronic circuit means connected to said scanning means and respectively correlated with said different recordings for recognizing and evaluating the same in response to signals received from said scanning means.

More particularly, the present invention proposes to solve the problem by providing an apparatus which can automatically recognize, differentiate and evaluate beam recordings as well as, for example, sawtooth type recordings, and then totalize the corresponding data in known storage counters and print out the results of the evaluation. Such an automatic apparatus makes possible, on the one hand, a mechanical evaluation of the diagram charts in a shorter time and, on the other hand, the avoidance of subjective errors. Also, the apparatus permits simultaneous print out, for example, for later wage calculations or other such purposes. Also, evaluation by such an apparatus is more accurate as the hitherto known apparatuses. Also, the apparatus makes it possible to compensate for displacements in the writing instrument in a simple manner.

The present invention solves the above problems by providing a diagram carrier which is continuously moved past a scanning station by a driving apparatus whose velocity corresponds to the frequency of time pulses generated by the latter. The scanning station has a plurality of individual scanning sensors, these being so arranged that each recorded track is perpendicular to the scanning direction of the sensors. The recorded width of each recording sensed by at least a part of the sensors and the scanning station is connected to following logic electronic circuits, each of the latter being adapted to recognize and evaluate one of a plurality of types of recordings. According to a presently preferred embodiment, as many different electronic logic circuits are provided as are provided different types of recordings and the electronic circuits are connected parallel to each other and are also commonly electrically connected to the scanning station. According to another characteristic of the invention, the scanning station includes fixed photoelectric elements, these being arranged adjacent to one another in the direction of movement of the diagram markings of the writing instrument. The elements cover a wider part of the diagram chart then the width of any track and can pick up or sense each of the individual diagram tracks even if these are slightly displaced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2, comprising

DESCRIPTION OF THE PREFERRED EMBODIMENTS

Figure 1:
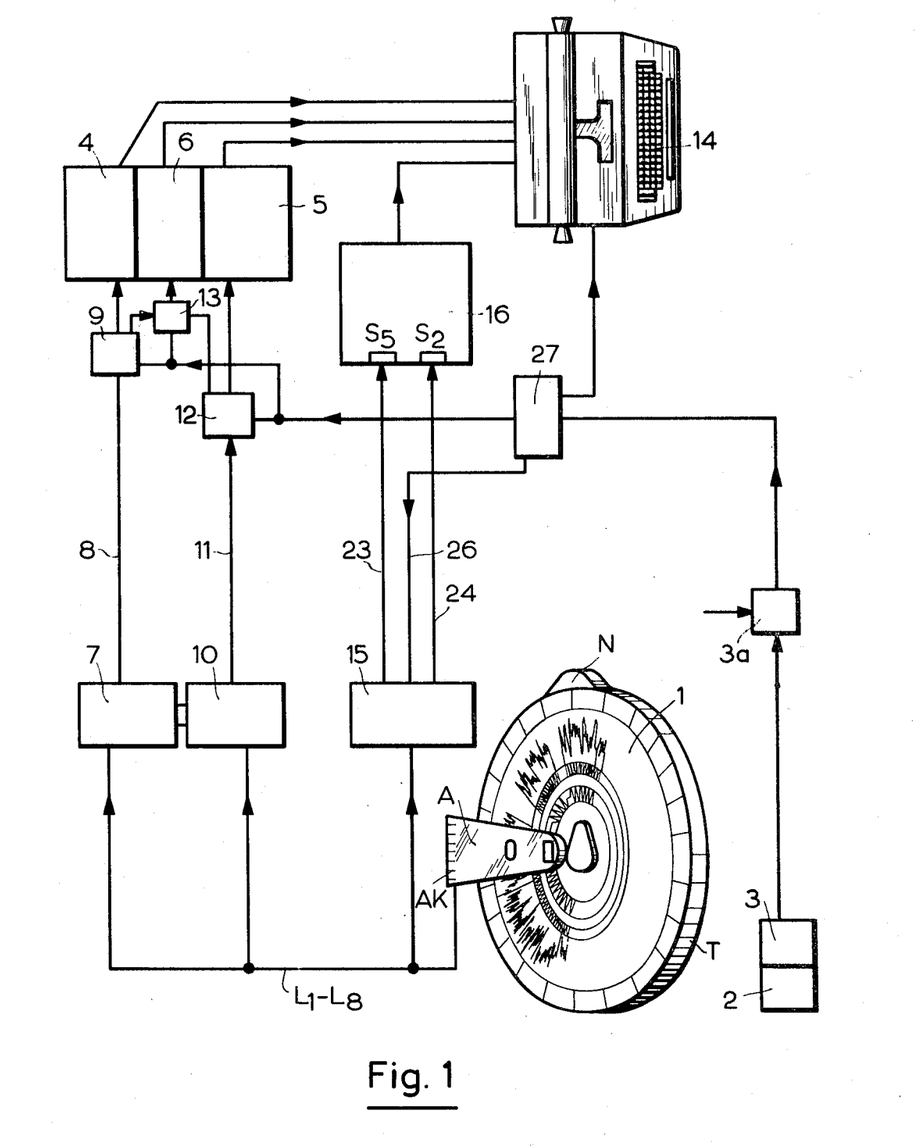
FIG. 1 shows schematic block diagram of the construction of an evaluating apparatus for diagram charts in accordance with the present invention.

In FIG. 1, a diagram disk or chart 1 is shown supported on a table T, the latter being continuously driven by a motor 2 for rotation about 360°. Simultaneously, the motor 2 is coupled to a pulse generator 3 which generates time pulses having a frequency in fixed relation or correlated to the speed of rotation of the diagram chart 1. For example, if the pulse generator 3 is for a 24-hour chart, then it rotates in a recording instrument within 24 hours 360° and generates 1,440 pulses if one pulse is made available for every recorded minute. In the aforementioned example, the accuracy of the automatic evaluation is increased, when the pulse generator 3 generates 7,200 pulses for a 24 hour chart. In this case, for every recorded minute, five pulses are generated, and the evaluation provides 12 second accuracy. These pulses are true time pulses which can more easily be interpreted by recognition circuits which are connected thereto, such as commonly known time pulse counters. Through suitable means (not shown), the gate 3a following the pulse generator 3, is initially openned for the passing through of the time pulses when the diagram chart 1 "zero" time radius passes under the scanning station A. This "zero" time indication can be derived from a fixed attachment (not shown) or from a special marking on the chart itself.

Immediately when "zero" time is detected, time pulses commence to be transmitted from the pulse generator 3 to the evaluating apparatus, so that a time evaluation of the data inscribed on the diagram chart is made possible, as will be described hereafter.

Every five pulses from the pulse generator 3 are summed or totaled in the pulse counters 4, 5 and 6. In FIG. 1, the pulse counter 4 is provided for the identification of the time period during which the narrow beams are recorded. The pulse counter 5 serves to sum the time during which wide beams are recorded on the chart. The pulse counter 6 sums the standing times and also has the additional task to indicate the start of a recording operation, the beginning of the operation by time pulses arriving at this counter which have been counted between the "zero" time passage and the beginning of a beam recording. Thus, the counter 6 also counts the time pulses from "zero" time until a beam recording is identified. The pulse counter 4 is preceded by a recognition circuit 7, which is activated by the scanning of a narrow beam. The appearance of a narrow beam generates a pulse at the conductor 8, the latter opening a gate 9 for the passage of the time pulses to the counter 4. A recognition circuit 10 is provided which can detect broad or wide beams under the chart electro-optic sensing or scanning station A. If such a wide beam is detected, this circuit generates and transmits a pulse over a conductor 11 to a gate 12, the latter opening so that time pulses from the pulse generator 3 can be transmitted to the pulse counter 5. The gates 9 and 12 are so constructed that in the closed condition, when no narrow and no wide beams are recognized by the scanning station A, a gate 13 is opened through which the pulses from the pulse generator 3 are transmitted to the pulse counter 6. The pulse counter 6 ascertains at the beginning of an evaluation the start of operation of the vehicle. With the starting of the motor a narrow or wide beam is recorded on the diagram chart, the recognition of these beams produces pulses which are transmitted to close the gate 13, the resulting sums of the hitherto transmitted time pulses representing the correct time up to the beginning of operation of the vehicle. The counted or stored pulses are totalled to the hours and the minutes in the counter 6. Advantageously, at the beginning of the recognition of a diagram beam recording, the contents of the counter 6 is printed out by tabulating machine 14 which follows the pulse counters 4–6. This way, at the beginning of the scanning, of the first beam recording on the diagram chart, the time is printed when the vehicle begins the day of driving. In the same way, after the evaluation of the diagram chart 1, the contents of the pulse counters 4 and 5 are printed in corresponding columns of a form by the tabulating machine 14. During the standstill of the motor vehicle the resulting wait or the standstill time of the vehicle is summed in the previously closed pulse counter 6, and printed in a separate space in the form. After the end of the last evaluated beam until passage of the "zero" time indication of the diagram chart 1, the generated time pulses are again transmitted to the pulse counter 6. Thus, together with the remaining, prior counted time periods, the total time available on the diagram chart, namely 24 hours according to the selected example, should result.

Figure 2A:
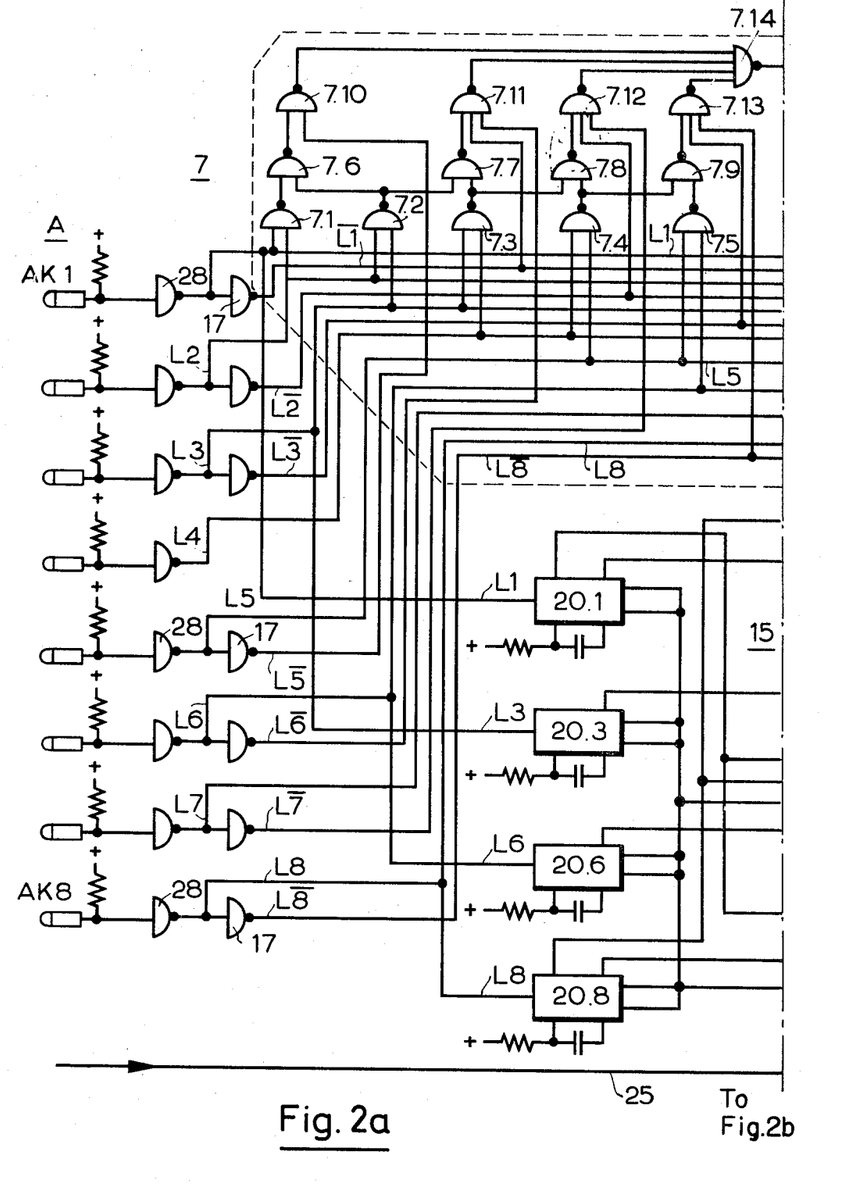
FIGS. 2a and 2b, shows the circuit of the scanning station and the electronic connecting circuits of the apparatus shown in FIG. 1.
Figure 2B:
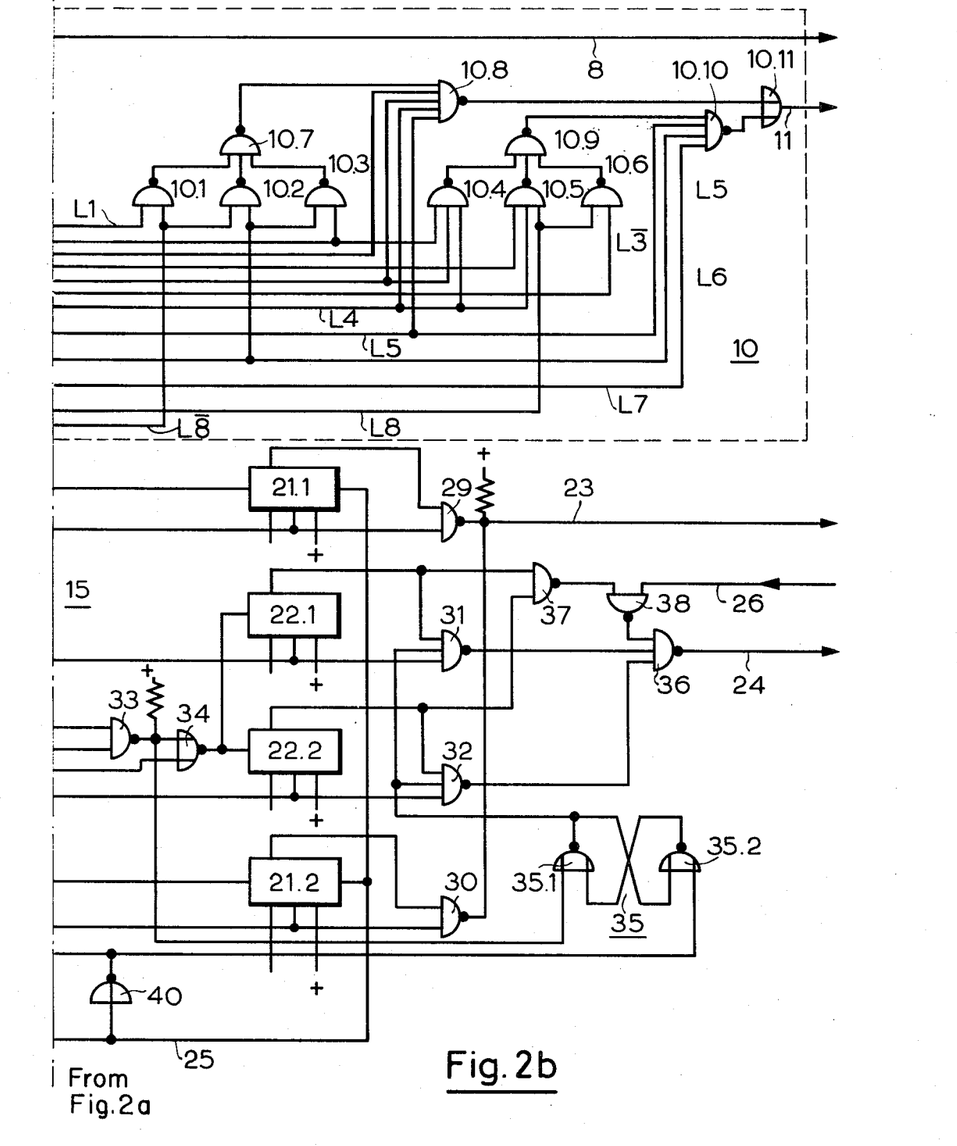

FIG. 2 shows the circuit construction of the scanning station A and the after connected logic circuits which serve to recognize the various or different possible diagram recordings. In accordance with a presently preferred embodiment, the scanning station A consists of eight individual photodiodes AK1–AK8, which are so arranged that they are in a row which is perpendicular to the diagram tracks but which project beyond or over and under the respective tracks. Herewith it is achieved that despite radial displacements of diagram tracks these are nevertheless scanned with certainty by at least part of the photo-diodes. The leads connected to the photo-diodes AK1-AK8 branch out, each of these leads being further split into two separate conductors. Thus, from the photo-diode AK1 proceeds a conductor which is divided into conductors L1 and $\overline{L1}$. The electronic circuit component 17 is an inverting or "not" circuit which provides that the signal on the conductor $\overline{L1}$ is always the opposite signal from that which appears on the conductor L1, the latter being inverted. The same occurs for the conductors connected to the other diodes AK2–AK8. As FIG. 2 clearly shows, the conductors L1, $\overline{L1}$ until L8 and $\overline{L8}$ are all connected to recognition circuits 7 and 10. The recognition circuit 7 consists of fourteen NAND-gates 7.1 to 7.14, these being so connected with each other that three to four signals from the scanning station A are required to recognize that a narrow beam passes under the scanning station A. In this case, as will more specifically be described below, a pulse appears at the output on the conductor 8 which causes, as can be seen in FIG. 1, the time pulses from the pulse generator 3 to be transmitted to the pulse counter 4 through the gate 9. The recognition circuit 10 consists of 10 NAND-gates 10.1–10.10 and one OR-gate 10.11, these being so connected with each other that 5 to 6 signals are required from the scanning station A to recognize a wide or broad beam recording. The manner in which these circuits operate will later be explained. If a wide beam if recognized, a signal is transmitted over the conductor 11 to the after connected gate 12, this causing the time pulses from the pulse generator 3 from that time to be transmitted to the pulse counter 5.

In FIG. 1, another recognition circuit 15 is shown which is also connected to the individual conductors L. In the aforementioned example, according to FIG. 2, this is connected to the conductors L1, L3, L6 and L8, these being connected to the inputs of the recognition circuit 15. The circuit 15 consists of 4 monostable flip-flops 20 and four bistable flip-flops 21 and 22 connected thereafter. With the assistance of these further components, the functions of which will further be explained later, signals leave the recognition circuit 15 over an output lead 23 or a further output lead 24 to a subsequently connected pulse counter 16, which sums up the driven distance, e.g., the number of kilometers driven. At the beginning of the scanning of a distance recording, a start signal for the recognition circuit 15 is transmitted over a conductor 25, which sets or resets the circuit 15 in condition to recognize the distance chart and to transmit corresponding output signals. As soon as the last of the 7,200 time pulses (corresponding to 24 hours) has been generated, over a conductor 26 a turning off signal is transmitted from the pulse generator 3 or from an after connected time counter 27. In this manner a complete chart rotation is carried out.

In the aforementioned example, a narrow beam is recorded by the recording instrument for the time during which the motor of the vehicle is operating and a wide beam during the driving time of the vehicle. Thus, purely driving time is also recorded. During the standstill of the motor, no beam is recorded and during this time the time pulses are transmitted from the pulse generator 3 to the pulse counter 6. For this reason, at the beginning of any evaluation, the pulse counter 6 records the hours and minutes from the "zero" time until operation starts. Thus, the operating time without driving is recorded in the pulse counter 4, and the total driving time of the vehicle is recorded in the pulse counter 5, and these times are totallized during the day. After these values are totalized, they are printed out by the tabulating machine 14. The pulse counter 6 continues to totallize the time, from the end of vehicle operation until "zero" time. This last time registration serves only as a control check, since the sum of the number totalled and printed out by the tabulating machine, must show a total of 24 hours time, if the evaluation has been properly carried out.

On the diagram chart 1 a closed track is evaluated, which the recording instrument has recorded for a driver "I" of a truck. A great number of the recording instruments, in particular for long distances trucking, are so arranged that it is possible to switch tracks on the tachograph chart to identify different drivers. When driver "II" takes over the driving, it is necessary to switch to another track which now records the working time, driving time, as well as standing time for the driver "II". This track for the driver "II" on the diagram chart 1 is a different track from that used for driver "I" and can be evaluated by the evaluating apparatus in exactly the same manner as the track for the driver "I". To accomplish this result, it is only necessary for the evaluation that the scanning station A can be moved to a position in which it can sense the track of the chart for the driver "II".

As already mentioned, on one of the further tracks of the diagram chart, the distance recording is carried and therewith the accumulated driven distance. For the recognition of the distance recording, a recognition circuit 15 is provided, which is followed by a pulse counter 16 in which the driven kilometers are summed. With this counter 16 is connected the tabulating machine 14, so that after the evaluation of the distance recording the driven distance can be printed out in a particular column of a form, corresponding to the markings on the diagram chart 1. The principle of distance recognition is known. The distance recording is inscribed as a sawtooth type wave. To obtain such a recording, the writing instrument is driven by a mechanical odometer or distance counter (e.g. kilometer counter) in such a way that it moves firstly a distance in one direction and after passing this distance, then the writing instrument is reversed in its direction. This is achieved through a eccentric-mounted disk in which the pen is deflected by a half of a rotation in one direction and by the other half of rotation in the reverse direction. That gives a sawtooth recording, and also gives a number of reversing points, this providing an indication of the total number driven kilometers. By visual evaluation, as previously mentioned, the peaks are counted and multiplied by five, this giving the calculation of the entire distance driven during a day. By the aforementioned machines, evaluation of the distance diagram requires that scanning station A be capable of ascertaining how many peaks the recorded sawtooth recording exhibits. The counting of these peaks and the evaluation of the driven distances is accomplished with the recognition circuit 15, as later to be more specifically described.

In, the FIG. 2, the circuit for the scanning station and the three previously mentioned recognition circuits 7, 10 and 15 are shown. In the scanning station A, in accordance with the presently preferred embodiment, eight scanning sensors are provided i.e., there are eight photo-diodes Ak1–AK8 arranged in the scanning station A.

Scanning a Beam Diagram

The evaluation apparatus for the diagram charts is so arranged that the diagram chart 1 is thrown through an inlet slot and there, gripped by a rotating gripping device (not shown), not forming part of the invention. The motor 2 drives a record carrier or carrying table T on which the chart is held by the gripping device and scanned. The scanning station A is positioned opposite a track, on which a beam recording is to be scanned and evaluated. On the carrying table T is the fixed chart 1. The motor 2 is turned so long until the "zero" time radius passes under the scanning station A. In FIG. 1, the disk table T is provided with a cam N, which operates a microswitch (not shown) in a well known way when the "zero" time indication passes, this producing a pulse to the gate 3a to open the latter. The diagram 1 chart is constructed to mate with the surface of table T, the former having a locating hole to insure that it is correctly placed (with respect to time) on the table T, so that when the diagram chart 1 passes with its "zero" hour position under the scanning station A, the gate 3a is electrically activated. As soon as the gate 3a is opened, or from "zero" time in the evaluating instrument, the time pulses are transmitted from the pulse generator 3 to the pulse counters 4–6. By a subsequent initiation of the microswitch, after a complete revolution of the diagram chart 1, the gate 3a is again closed. Also, this second pulse from the microswitch can, if desired, be used to terminate a track evaluation.

Since no recordings normally appear on the track of the diagram chart 1 under the scanning station A, until work starts, that is until the start of the motor, the gate 13 is opened so long until a beam is recognized by the scanning station A. At the beginning of a beam recording the scanning station A controls the signals appearing on conductors 8 or 11 which each close the gate 13. Thereby the summed up time pulses are stored in the counter 6 and represent the exact time when the vehicle is started or placed into operating condition. The gate 13 closing signal can thus be used to start the tabulating machine 14 to print out the contents of the counter 6 in the column headed "work starts" on a suitable form. The pulse counter 6 may at this time be cleared.

Under the assumption that the recording instrument records a narrow beam when the motor is turned on and a wide beam during driving, the scanning station A begins the evaluation of the beam recording when a narrow beam is sensed and scanned. According to the distance that the photo-diodes AK1–AK8 are from the middle point of the beam recording on the chart 1, this will determine whether they are activated or not. The photo-diodes AK, which are positioned adjacent to a beam, will read a dark value. Because of the movement and the recording tolerances, the width of the beam recording is recognized as follows:

The table 1 shows the possible logical combinations for the recognition of a narrow beam, the table 2 the same for a wide beam.

TABLE 1

| Scanning station A | | | | | | | | Output signals from the gates | | | NAND-gate 7.14 |
|---|---|---|---|---|---|---|---|---|---|---|---|
| 1 | 2 | 3 | 4 | 5 | 6 | 7 | 8 | | | | |
| 1 | 1 |   |   | 0 |   |   |   | 7.1=0 | 7.6=1 | 7.10=0 | 1 |
|   | 1 | 1 |   | 0 |   |   |   | 7.2=0 | 7.6=1 | 7.10=0 | 1 |
| 0 | 1 | 1 |   |   | 0 |   |   | 7.2=0 | 7.7=1 | 7.11=0 | 1 |
| 0 |   | 1 | 1 |   | 0 |   |   | 7.3=0 | 7.7=1 | 7.11=0 | 1 |
|   | 0 | 1 | 1 |   |   | 0 |   | 7.3=0 | 7.8=1 | 7.12=0 | 1 |
|   |   | 0 |   | 1 | 1 |   | 0 | 7.4=0 | 7.8=1 | 7.12=0 | 1 |
|   |   |   | 0 | 1 | 1 |   | 0 | 7.4=0 | 7.9=1 | 7.13=0 | 1 |
|   |   |   | 0 |   | 1 | 1 | 0 | 7.5=0 | 7.9=1 | 7.13=0 | 1 |

The first row of Table 1 corresponds to a narrow beam being positioned under the scanning station A so that only the photo-diodes AK1 and AK2 sense the narrow beam while the photo-diodes AK3 to AK8 scan the light diagram chart surface. The circuit is so arranged that the negating or "not" elements 28 following photo-diodes AK1–AK8 generate "1"-signals when the respective prior photo-diodes are interposed opposite a dark marking or a recording and generate a "0" signal when a light marking is interposed or when the diagram chart surface is scanned. Therewith appears on conductors L1 and L2 a "1" signal and a "0" signal appears at the output of the NAND-gate 7.1. Since the latter is connected to the NAND-gate 7.6, a "1"-signal is transmitted to one input of the gate 7.10. Since the photo-diode AK5 is interposed against a light spot on the chart, the signal on the conductor L5 is "0" and on $\overline{L5}$ is "1". Since the conductor $\overline{L5}$ is connected to the other input of the gate 7.10, the "1" signal is simultaneously transmitted to the gate 7.10. This causes the signal at the output of NAND-gate 7.10 to go to "0". If a "0" signal appears at one of the inputs to the NAND-gate 7.14, the latter is compelled to produce at its output a "1" signal on the conductor 8. This "1" signal on the conductor 8 opens the gate 9 and permits the time pulses to be transmitted from the pulse generator 3 to the pulse counter 4. For the recognition of these narrow beams, by the photo-diodes AK1, AK2, only three signals are required, and a "1" signal appears on the conductor 8. In the further rows, in particular rows 3-8, it is shown that in some instances also four signal are required in order to cause an output signal "1" to appear on the conductor 8.

For the reasons just explained, the circuit is so arranged, that it is totally immaterial what the signals are at the outputs of the diodes AK3, AK4, AK6, AK7 and AK8 in the combination in the first row in the Table 1. Thereby, since the output gate 7.14 is a NAND-gate, it is enough that at one of its four signal inputs a "0" signal appears, and in each case a "1" signal will appear on the conductor 8. In order to prevent errors and to reduce overlap with the broad beam recordings, it is convenient during recognition of the narrow beam recordings, to simultaneously utilize "1"-signals on the conductors L1, L2, L3, etc. as well as one or two signals on the negated or "not" conductors $\overline{L1}, \overline{L2}$, etc. This is done to clearly differentiate the narrow beam recordings from the broad beam recordings. The clear recognition of the narrow beam recordings therefore requires at least three and mostly four signals in the appropriate combination, as the Table 1 shows.

TABLE 2

| Scanning station A | | | | | | | | | | | | OR-gate 10.11 |
|---|---|---|---|---|---|---|---|---|---|---|---|---|
| 1 | 2 | 3 | 4 | 5 | 6 | 7 | 8 | Output signals from the gates | | | | |
| 1 | 1 | 1 | 1 | 1 | — | — | 0 | 10.1=0 | 10.7=1 | 10.8=0 | 10.10=1 | 1 |
| — | 1 | 1 | 1 | 1 | 1 | — | 0 | 10.2=0 | 10.7=1 | 10.8=0 | 10.10=1 | 1 |
| 0 | 1 | 1 | 1 | 1 | 1 | — | — | 10.3=0 | 10.7=1 | 10.8=0 | 10.10=1 | 1 |
| 0 | — | 1 | 1 | 1 | 1 | 1 | — | 10.4=0 | 10.9=1 | 10.10=0 | 10.8=1 | 1 |
| — | 0 | — | 1 | 1 | 1 | 1 | 1 | 10.5=0 | 10.9=1 | 10.10=0 | 10.8=1 | 1 |
| — | — | 0 | — | 1 | 1 | 1 | 1 | 10.6=0 | 10.9=1 | 10.10=0 | 10.8=1 | 1 |

The recognition circuit 10 comprises 10 NAND-gates 10.1–10.10 which consists of two groups of five NAND-gates which are logically connected with each other and make available respective output signals. The gates are so arranged that gates 10.1, 10.2, 10.3, 10.7 and 10.8 form one group and the gates 10.4, 10.5, 10.6, 10.9 and 10.10 form a second group of NAND-gates. Each of these groups have end gates 10.8 and 10.10 which respectively provide an output signal to the after connected OR-gate 10.11. The OR-gate 10.11 generates an output signal over a conductor 11 to the gate 12 to open the latter, when a wide beam recording is recognized. In this manner, the time pulses can be transmitted from the pulse generator 3 to the pulse counter 5. The combinations of the individual signals from the scanning station A in Table 2 show that every row of this table is arranged so that the respective output signals of the various gates are so selected that together they cause a "1" signal to appear at the output of the gate 10.11. Also, it can be seen from this Table that in every row where a dash or bar is provided, the signal on the corresponding conductor L or $\overline{L}$ is without influence on the resulting logical combinations or the output of the recognition circuit 10. Only registered signals, i.e., "1" or "0" signals, in the Table 2 serve to clearly recognize a wide beam recording. As already stated before, the wide beam recordings are recorded by the recording instrument only when the vehicle drives.

Pauses during which the vehicle does not drive and the motor is turned off, i.e., in the rest or stop position, cause a straight line to be recorded on the chart along a track by the writing instrument. Such a line is not recognized by either the recognition circuit 7 or the recognition 10, so that the gates 9 and 12 remain blocked. As already stated in connection with FIG. 1, a blocking of the gates 9 and 12 opens the gate 13, so that during a pause or standing still time, the time pulses of the pulse generator 3 are transmitted to the pulse counter 6 and there are totalized. A counter (not shown) can advantageously be connected in parallel to the counter 6 which only sums the still standing time periods, so that one can recognize how often the vehicle does not run during a working day. From this information, one can determine after deduction of the prescribed pauses, how many customers were called on with the vehicle, e.g., the time during which loading and unloading was carried out. Such additional apparatus has advantages but has little to do with the recognition and the evaluation of the beam recording and therewith with the present invention.

During one revolution of the diagram chart 1, the operating time, the driving time and standing time are simultaneously identified and added in the storage units 4, 5 and 6. In the above explained manner, the beam recording ends with the switching off of the vehicle motor when this is finally turned off for the day. From the scanning station A and over the recognition circuits 7 and 10 the controlled gates 9 and 12 are now closed, the gate 13 thereby automatically opens and the time pulses from the pulse generator 3 are counted in the pulse counter 6 until the time counter 27, connected after the gate 3a, runs up to the count of 7,200. Time pulses for evaluation are thus ended. The output signal from the counter 27 simultaneously closes all gates, including the gate 13, and ends the evaluation. An output signal is transmitted to the tabulation machine 14 and this starts to print out a line, whereby the carriage of the tabulating machine 14 interrogates the individual counters 4, 5 and 6 whose contents are printed out in corresponding columns of suitable forms. The sum of the numbers in the columns of the recorded form must thereby equal 24 hours, otherwise the evaluation is incorrect.

In concluding to explain the recognition circuits 7 and 10 it should here also be mentioned that the construction of these circuits and the corresponding modifications of the connections can also be carried out with other gates e.g. NOR components, without changing the inventive concept.

In a similar manner, as before when a beam recording in a track was sensed and evaluated, by changing the position of the scanning station A in relation to the diagram chart 1, a second track or beam recording can be scanned and evaluated, which for example is associated with a second driver who is required for overland vans or trucks. It is equally possible to arrange a second scanning station A for a second track and thereafter connecting additional circuits which correspond to original recognition circuits 7 and 10 so that two tracks from the diagram chart are simultaneously evaluated. It is then the task of the tabulating machine 14 first to interrogate the pulse counter 4, 5 and 6 of one track and to print out their contents and afterward to likewise print out in a second column the contents of the pulse counters 4, 5 and 6 for the seocng arrangement. In construction it is considerably less costly to provide one scanning station A, as in the prior example, since the evaluation revolution of the diagram chart 1 and displacement of the scanning station A relative to the diagram chart 1 only requires a fraction of a second.

Stated again, it is thus proposed that the recognition of a narrow beam recording requires at least three and at most four signals from the scanning station A. On the other hand, the recognition of a wide beam recording requires at least five and at most six signals.

Also it is clear, as pointed out, that the overlap during recognition is impossible. Thus, the circuits always can distinguish between narrow and wide recordings. The possible logic combinations for recognizing a narrow beam recording results in the following formula:

$$1 \cdot 2 \cdot \bar{5} + 2 \cdot 3 \cdot \bar{5} + \bar{1} \cdot 2 \cdot 3 \cdot \bar{6} + \bar{1} \cdot 3 \cdot 4 \cdot \bar{6} + \bar{2} \cdot 3 \cdot 4 \cdot \bar{7} +$$
$$\bar{2} \cdot 4 \cdot 5 \cdot \bar{7} + \bar{3} \cdot 4 \cdot 5 \cdot \bar{8} +$$
$$\bar{3} \cdot 5 \cdot 6 \cdot \bar{8}$$

After performing the appropriate Boolean algebraic operations on the above relationship, this results in the following formula for a narrow beam:

$$\overline{5(\overline{1 \cdot 2} \cdot \overline{2 \cdot 3}) \cdot \overline{1 \cdot 6}(\overline{2 \cdot 3 \cdot 3 \cdot 4}) \cdot \overline{2 \cdot 7}(\overline{3 \cdot 4 \cdot 4 \cdot 5}) \cdot \overline{3 \cdot 8}(\overline{4 \cdot 5 \cdot 5 \cdot 6})}$$

The recognition of a wide beam diagram results in the following formula:

$$1 \cdot 2 \cdot 3 \cdot 5 \cdot \bar{8} + 2 \cdot 3 \cdot 5 \cdot 6 \cdot \bar{8} + \bar{1} \cdot 2 \cdot 3 \cdot 5 \cdot 6 +$$
$$\bar{1} \cdot 3 \cdot 5 \cdot 6 \cdot 7 + \bar{2} \cdot 5 \cdot 6 \cdot 7 \cdot 8 + \bar{3} \cdot 5 \cdot 6 \cdot 7 \cdot 8$$

After performing the appropriate Boolean algebraic operations on the above relationship, this results in the following formula:

$$\overline{2 \cdot 3 \cdot 5(\overline{1 \cdot 8 \cdot 6 \cdot 8 \cdot 1 \cdot 6}) \cdot 5 \cdot 6 \cdot 7 \cdot (\overline{1 \cdot 3 \cdot 2 \cdot 8 \cdot 3 \cdot 8})}$$

Distance Recognition and Evaluation

When the scanning station A is moved to a position, in which the sawtooth type distance recording can be sensed, a signal is simultaneously transmitted on the conductor 25 to the distance recognition circuit 15. This signal has the effect that from this time signals which are received from the scanning stations A by the recognition circuit 15 can be operated upon. For the recognition of the distance recording, in the prior mentioned example, only 4 of the 8 photo-diodes AK1— AK8 are switched in. These are the diodes AK1, AK3, AK6 and AK8. The conductors L1, L3, L6 and L8 are connected to the inputs of the monostable flip-flops 20 so that the lead L1 is connected to the monostable flip-flop 20.1, lead L3 to the monostable flip-flop 20.3, the conductor L6 to the monostable flip-flop 20.6 and the conductor L8 to the monostable flip-flop 20.8. The monostable flip-flops are followed by bi-stable flip-flops 21(21.1 and 21.2) and 22 (22.1 and 22.2) as previously mentioned. In the normally blocked condition, the flip-flops 21 are in the "0" output state and the flip-flops 22 are in the "1" output state.

These conditions are assured by resetting the bistable flip-flops 21 and 22 at the beginning of a distance evaluation. This is accomplished by the provision of the signal on the conductor 25, the latter signal being applied directly to the flip-flops 21.1 and 21.2 and through the NOR-gate 34 to the flip-flops 22.1 and 22.2.

The NAND-gate 29 and the NAND-gate 30 are thus blocked at the start of distance scanning. Thus, if the distance recording is initially recognized by either the diode AK8 or the photo-diode AK1, the pulses generated by the respective monostable flip-flop 20.8 and 20.1 cannot be counted. According to the presently preferred embodiment, the evaluation circuit only permits the introduction of 2 or 5 kilometer distances into the pulse counter 11. A shorter up or down movement or segment at the beginning of a distance recording can, because of the position of the scanning points AK1 and AK8, at most be one kilometer. One of two NOR-stages comprising the flip-flop 35 is so connected over a NAND-gate 33 that the left stage 35.1 is initially set in the "1" output state. Thus, when a setting pulse signal appears on the conductor 25, this signal is inverted by the "not"-gate 40. The output of the gate 40 is applied to one of the inputs of the NOR-gate 35.2 to thereby assure that the bistable flip-flop 35 has a "0" signal at the output of the NOR-gate 35.2 and a "1" signal at the output of the NOR-gate 35.1. The output from the latter gate "enables" the NAND-gates 31 and 32, as will be described hereafter. However, as soon as either monostable flip-flop 20.1 or 20.8 are activated and transmit a pulse, as will hereafter be described, this changes the states of the gates 35.1 and 35.2. Now the output signal from the gate 35.1 is "0" and the output from the gate 35.2 is "1". In this condition, the two NAND-gates 31 and 32 are blocked. If, after a pulse appears on conductor L1 or a conductor L8 a following pulse appears on conductor L3 or conductor L6 the monostable flip-flops 20.3 and 20.6 become triggered and pulses are stored in the flip-flops 22.1 and 22.2. The latter pulses, however, cannot be utilized for counting as long as the gates 31 and 32 are closed or blocked by the presence of a "0" signal at the output of the NOR-gate 35.1. Thus, a starting pulse from the NAND-gates 31 and 32 can only be transmitted to counter 16 when the distance recording is initially sensed either on conductor L3 or L6, i.e. prior to activation of either of the monostable flip-flops 20.1 or 20.8.

It will now be assumed that neither of the mono-stable flip-flops 20.1 or 20.8 have yet been activated. In this condition, as described above, the NOR-gate 35.1 remains in its initial state as set by the initial resetting signal, i.e. the output level is a "1" signal. Also, as previously described, the output levels of the bistable flip-flops 22.1 and 22.2 are also initially set to "1" signals. If only one signal now appears on the conductor L3 or L6 prior to a further signal on the conductors L1 or L8, a pulse is transmitted over the NAND-gate 36 and the conductor 24, this being transmitted to the pulse counter 16. Thus, if a signal appears on L3, this causes the mono-stable flip-flop to generate a "1"

signal for a predetermined time at its output. When the "1" signal is thus applied to the third input of the NAND-gate 31, the output of said gate generates a "0" signal since the other inputs likewise have "1" signals applied thereto, as described above. The output of the NAND-gate 31 is connected to one of the inputs of the NAND-gate 36. Since the appearance of a "0" signal at any of the inputs of a NAND-gate forces the output to generate a "1" signal, the "0" signal at the output of the NAND-gate 31 causes a "1" signal to be generated on the conductor 24. This "1" signal pulse is transmitted over the conductor 24 to the pulse counter 16 as shown in FIG. 1. At the input of the pulse counter 16 a signal generator S2 is built in which triggers two pulses so that such scanning of a distant recording records 2 kilometers in the counter 16. If signals appear, however, both on conductors L3 and L6 prior to a further signal on the conductor L1 or L8, two pulses are transmitted over the conductor 24 to the pulse counter 16 each pulse being generated in the manner described above. The two pulses are each effective so that the signal generator S2 is triggered twice so that 2 times 2 kilometers which equals 4 kilometers are counted.

If a signal on the conductor L8 appears directly after a signal on the conductor L6, one cannot yet count 5 kilometers in the pulse counter 16. Five kilometers are counted on the occurrence of a peak, but only when the recording has moved from one peak to another. A count of 5 kilometers at the first peak is prevented as long as the gates 29 and 30 are still blocked by the flip-flops 21.1 and 21.2. However, at the occurrence of a first peak the flip-flop 35 is now flipped so that the left gate 35.1 has a "0" signal at its output. The monostable flip-flops 20.1 and 20.8 each have two outputs which provide both a "0" and a "1" signal level. The outputs generally producing the "0" signals are connected to the NAND-gates 29 and 30. The outputs generally producing "1" signals are each connected to one of the inputs of the NAND-gate 33 and also respectively connected to one of the inputs of the bistable flip-flops 21.1 and 21.2. Thus, with both inputs to the NAND-gate 33 at the "1" level, the output of said gate is at the "0" level. This at first cannot alter the initially set conditions of the flip-flop 35. However, when either of the mono-stable flip-flops 20.1 or 20.8 are activated, the signal levels at the two outputs reverse. Thus, a "1" signal is transmitted to one of the gates 29 or 30. However, simultaneously a "0" signal is transmitted to one of the inputs of the gate 33. With this, the gate 33 becomes blocked and its output becomes a "1" signal pulse which is applied to the NOR-gate 35.1. This flips the flip-flp 35 to produce a "0" signal at one of the inputs of the NAND-gates 31 and 32, as already described. In this condition, all further pulses from AK3 and AK6 are blocked by the gates 31 and 32. After the appearance of a signal on the conductor L8 from the mono-stable multivibrator 20.8, the flip-flop 21.1 is changed to the "1" state. For a thus following pulse on the conductor L1 the gate 29 is "enabled". If a pulse appears on L1 this now causes an output signal on the conductor 23, this being transmitted to another input of the distance counter 16. At this input, the pulse counter 16 is provided with a different signal generator S5 which when triggered by a pulse provides five pulses to the pulse counter 16 and the latter indicates or registers 5 more kilometers. Through the appearance of the pulse over the conductor L1, however, the flip-flop 21.2 is thereby also flipped to provide a "1" output, the trailing edge of the pulse closing the gate 29 again or flipping it to produce a "0" output level. Thus, when a recording is recognized by either AK1 or AK8, the corresponding monostable flip-flop 20.1 or 20.8 generates a signal on the conductor connecting the latter with the respective bistable flip-flop 21.2 and 21.1 to reset the same. When reset, the outputs of the flip-flops 21.1 and 21.2 provide "1" signals to the following NAND-gates 29 and 30, to thereby "enable" the same. However, the other outputs of the monostable flip-flops 20.1 and 20.8 are connected to the respective flip-flops 21.1 and 21.2. Thus, for example, when AK1 senses a recording, the flip-flop 20.1 causes the flip-flop 21.1 to generate a "0" output signal, to thereby extinguish the NAND-gate 29, and causes the flip-flop 21.2 to generate a "1" signal to thereby enable the NAND-gate 30. A recognition by the sensor AK8 similarly extinguishes the NAND-gate 30 and "enables" the NAND-gate 29. These steps repeat with the occurrence of each peak on the distance recording and detected by AK1 and AK8. Thus, a second pulse on the conductor L1 cannot be transmitted through the blocked gate 29. This avoids errors in the case where the vehicle comes to rest at a time when a peak has been reached on the distance recording, this producing many points at the same amplitude as the peaks.

At the start of the scanning of a distance recording, the different lengths of the rising or falling flanks prior to the first diagram peak are recognized by the recognition circuit 15 to obtain the smallest possible error. Subsequently, until the last peak in such a distance recording is reached, only uninterrupted connecting lines from one peak to next following one follow. The connected line between two peaks can naturally be bent through stoppage of the vehicle, but it does not influence the photo-diodes AK, as described. Now, after the beginning of operation of the distance recording and after counting the first peak, only subsequent peaks of the distance curves are counted, the corresponding output signals from each of these are transmitted to the conductor 23 and result in a registration of 5 kilometers in the pulse counter 16.

With every pulse on L1 or L8 the flip-flops 22.1 and 22.2 are also reset to produce "1" output signals. However, both of these flip-flops 22 cannot permit the transmission of outward signals, when the gates 31 and 32 are blocked by the flip-flop 35, as described. Thus, after every first signal on L1 and every first signal on L8, output pulses are alternately transmitted by the NAND-gate 29 and 30 during the evaluation of distance recording, to the conductor 23. Each of the signals at the gate 29 or the gate 30 close the latter after its passage, as already described. Thus, a second signal (after a peak in the diagram) on the same lead cannot pass anymore through the same gate which closes as soon as a first pulse passes through it, so that an error count therewith is reliably prevented. After counting the last diagram peak of the distance recording follows a rising or falling end part of the recording until the vehicle stops. Here the circuit 15 is again checked, so see if the last pulse was transmitted to the conductor L6 or the conductor L3. At the end of the revolution of the diagram chart 1, a signal on the conductor 26 is transmitted from the counter 27 to the gate 38. As already explained, the flip-flop 22.1 and 22.2 are reset each time a peak appears through the output of either the monostable flip-flop 20.1 or 20.8. When reset, the outputs of the flip-flops 21.1 and 21.2 are at "1" levels. The two outputs from the flip-flops 22.1 and 22.2 are also connected to the NAND-gate 37. Thus, if no signals appear on L3 or L6 after a peak is sensed, the inputs to the NAND-gate 37 remain at "1" output level and the output of said gate remains at the "0" level. However, as soon as a signal appears on either L3 or L6 after a peak appears on L1 or L8, or on both, either or both the flip-flops 22.1 and 22.2 change states to produce a "0" level at its output. Even one "0" signal is sufficient to force the output of the NAND-gate 37 to go to a "1" level. Thus, when the counter 27 produces a "1" signal on the conductor 26, the output of the NAND-gate 38 goes to the "0" level and the output of the NAND-gate 36 produces a "1" level pulse which is transmitted on the conductor 24 to the counter 16, and in particular the signal generator S2 to thereby increase the count in the counter 16 by 2 kilometers. Through the circuit 15 for the evaluation of the distance recording is therewith achieved an accuracy of approximately ± 2 kilometers, which as compared to the hitherto known automatic evaluating apparatus for distance diagrams presents a substantial improvement, which in the best case provided an accuracy of approximately ± 5 kilometers. The function of the OR-gate 34 in the recognition circuit 15 has already been partially described. Thus, the OR-gate 34 permits the resetting of the flip-flop 22.1 and 22.1 both at the beginning of the evaluation and also after each peak is detected on the conductors L1 and L8. The input levels at the two inputs of the NAND-gate 33 are normally at "1" so that the output of the latter to the NOR-gate 34 is at the "0" level. As soon as either of the monostable flip-flops 20.1 to 20.8 are triggered, the output of the NAND-gate 33 goes to "1". The prior mentioned closing pulse from the time counter 27, which is utilized to interrogate the states of the flip-flops 22 over the conductor 26, also has the same function as before by the scanning of the beam diagram, namely it terminates the evaluation of the track and initiates the tabulating machine 14, during which the contents of the pulse counter 16 is interrogated and the ascertained driven kilometers are printed out in a corresponding column.

Thus, as already pointed out, a pulse on the conductor L1 to the monostable flip-flop 20.1 flips the latter and therewith a pulse is transmitted over the gate 29 onto the conductor 23. As soon as the monostable flip-flop 20.1 flips, an extinguishing signal is simultaneously transmitted from the other output to the flip-flop 21.2. An input signal at the monostable flip-flop 20.8 produces an output signal, which is transmitted over the gate 30 to the conductor 23. As soon as the monostable flip-flop 20.8 returns to its stable state, a signal from the other output is transmitted to the flip-flop 21.1 and extinguishes the latter. Every monostable flip-flop 20.1 to 20.8 sets the following circuit flip-flops 21.1, 21.2, 22.1, 22.2 after it receives a signal. The bistable flip-flops 21 and 22 serve as storage elements. The flip-flops 21.1 and 21.2 provide, over the after connected gates 29 and 30, a counting pulse over the conductor 23 to pulse counter 16. As already explained, these pulses act as trigger pulses for the signal generator S5 in the pulse counter 16. The pulses transmitted over the conductor 23 triggers 5 time pulses in the pulse counter 16 for registration therein. The flip-flops 22.1 and 22.2 provide, over the after connected gates 31 and 32, a pulse to the gate 36, these trigger pulses being transmitted over the conductor 24 to the pulse counter 16. These pulses are there provided to the signal generator S2 and therein doubled and therewith 2 kilometers are counted in the counter 16. Pulses at the flip-flops 22.1 and 22.2 can only be transmitted to the conductor 24 when the gates 31 and 32 are enabled by the flip-flop 35. As already explained, the gates 31 and 32, after the passage of the first peak of the distance recording, are closed and remain in the closed position until after the passage of the last peak. The output levels at the outputs of the flipped flip-flops 22.1 and 22.2 become "1" when a pulse is received on the conductors AK3 or AK6. The "1" signal level is stored or remains at the outputs of the flip-flops 21.1 and/or 22.2 until the latter are reset by the occurrence of a peak in the distance recording, as already described. If either of the flip-flops have flipped after the occurrence of the last peak, this information is obtained by the application of an interrogation pulse on the conductor 26 by the time counter 27 (after count of 7,200). If either or both the flip-flops 22.1 or 22.2 have flipped to produce a "0" signal at the input to the NAND-gate 37, and, therefore a "1" signal at the input of the NAND-gate 38, this will generate a "1" signal on the conductor 24 upon application of the "1" signal on the conductor 26. These pulses on the conductor 24 produce, as already explained, a count of 2 kilometers in the pulse counter 16. When the recognition circuit 15 is not to be workable, as, during the scanning of the beam recording, blocking voltages are applied to the monostable multivibrators 20.1 to 20.8 over the conductor 25, so that pulses of the conductors L1, L3, L6 and L8 of the monos 20 cannot be triggered.

From the above, it is clear that the circuit in accordance with FIG. 2 has three automatic circuits generally designated by the reference numerals 7, 10, and 15 for scanning and recognizing three types of recordings or recording patterns and operates in a way that the information contained in the recordings are transmitted to corresponding counters and there are summed up.

The construction and the operation of the tabulating machine 14 is not an object of the invention. Already such tabulating machines are known, which have a control bridge and release, in each column into which the carriage or type head is tabulated, a corresponding work program, depending on the position of the carriage. In the present embodiment of the evaluation circuit, the tabulating machine 14 first prints out the time until the operation begins, then prints the working time periods in the form of narrow beams, then time periods of driving, in the form of a wide beam and finally stand still periods taken from the pulse counter 6. The tabulating machine 14 interrogates the counter 16 in which the total number of kilometers are stored. When forming the total, the tabulating machine 14 can finally print a mark indicating the correctness of the evaluation if, after the evaluation of the stand still time, after the stand still of the vehicle until "zero" hours is checked, all time recordings have a total time of 24 hours.

The presently preferred embodiment, as shown in the FIGS. 1 and 2 together with the scanning station A, requires the least circuit expense. With equal results, however, also for scanning beam recordings, two scanning stations A can be provided, these together with two additional identical recognition circuits 7 and 10 must thereafter be connected. In a further embodiment, a third scanning station A can be provided for the recognition and sensing of the distance recording. All these embodiments are all within the inventive concept discussed in connection with the recognition circuit 7, 10 and 15.

Returning now to the construction of the scanning station A, on a standard diagram chart 1, the narrow beam recording is at most up to 1.5 mm wide, the wide beam recording being up to 2.5 mm wide and the distance recordings show a maximum width from about 5 mm. In accordance with presently known miniaturization techniques in the electronic arts, eight very small diodes AK1—AK8 are arranged adjacent to one another in a row, it being necessary that the row have a dimension greater than the largest width of the distance recording. The scanning station A is so constructed, that the diagram tracks are scanned and enlarged by an optical system 0 prior to transmission into the interior of the scanning station A so that the arrangement of the eight diodes AK adjacent to one another do not present construction difficulties. Through the scanning of the diagram tracks with the assistance of an enlarging optical system 0, the accuracy is accordingly improved. Since the arrangement of the photo-diodes adjacent to one another in regard of their distances, becomes uncritical due to the optical enlargement, the diodes can be so arranged that mutual influences by "light" or "-dark" are prevented with certainty.

Figure 3:
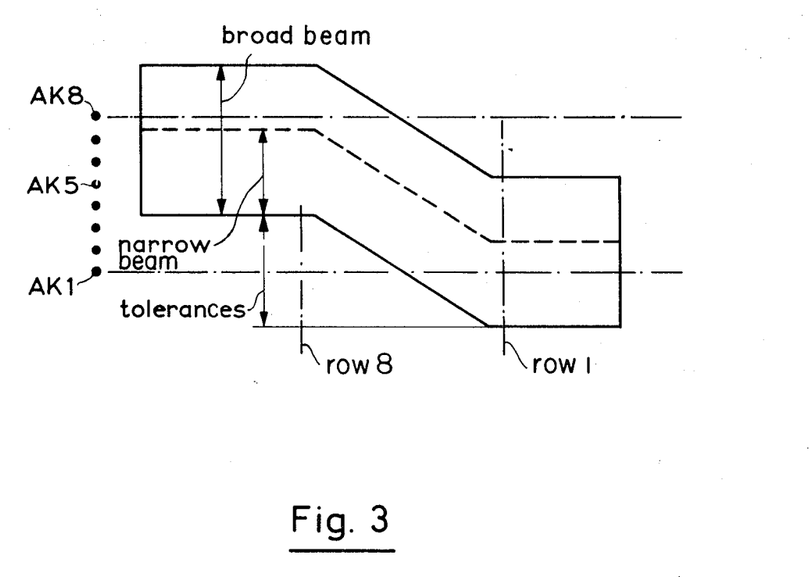
FIG. 3 shows the position of the scanning station and the possible fluctuations of the position of a scanned diagram recording path.

In the arrangement according to the presently preferred embodiment, a plurality of scanning sensors are fixed in the scanning station A, as opposed to the known scanning apparatus, by which an oscillating reading point is utilized. Thus, considerable cost reduction is realized in regard of the mechanical construction. Also, the difficulties known in the prior art in connection with width differentiation in beam recordings are alleviated. The counting of the recording widths in the beam recordings by means of a high frequency signal, requires a additional expense regarding the circuiting which is far beyond the expenses involved in the recognition circuits 7 and 10. It should again be mentioned that the unequivocal identification of beam recordings, independent from the variations in width and position of the recordings, can be unobjectionably obtained by the provision of several read out stations as explained above. In particular, FIG. 3 shows that the narrow beam recording can be offset a full recording width and still be satisfactory to be recognized and evaluated by the scanning station.

Without departing from the inventive concept, the evaluating apparatus can also be constructed, that only one pulse storage means for summing data scanned from the diagram disk 1 and information is provided. In this case for one revolution of the diagram disk only one type of information is selected, summed and by printed out the tabulating machine.

In regard to the previously described example, for the evaluation of a beam recording track for determination of the individual data, and for printing out the same, the following operations have to be carried out.

first revolution — work begins
second revolution — work stops
third revolution — driving begins
fourth revolution — driving ends
fifth revolution — working time
sixth revolution — driving time
seventh revolution — number of stops.

These revolutions are controlled by the counter 27 and after each revolution a different recognition circuit 7, 10, or 15 is connected by means of a type of stepping switch, to a respective pulse counter and, if necessary, calculating elements, e.g. S5 and S2 which are arranged preceeding the pulse counter.

After termination of the revolution associated with each recording by means of the stepping switch, not shown, the track switching of the sensing station A will also be started.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for automatically evaluating different recordings recorded along tracks of a diagram chart, said apparatus comprising carrier means for supporting the diagram chart; scanning means for scanning said recordings along said tracks; drive means for moving at least one of said diagram carrier means and said scanning means relative to the other at a predetermined speed, said scanning means having a plurality of sensing means arranged in a row transversely to said tracks so that each track is sensed by at least some of said plurality of sensing means; and a plurality of electronic circuit means connected to said scanning means and respectively correlated with said different recordings for recognizing and evaluating the same in response to signals received from said scanning means.

2. Apparatus as defined in claim 1, further comprising generator means for generating time pulse having a frequency correlated to said predetermined speed of said drive means, said time pulses being selectively transmitted in one of said plurality of electronic circuit means in response to recognition of a corresponding recording associated with said one electronic circuit means.

3. Apparatus as defined in claim 1, the number of electronic circuit means is equal to the number of different types of recordings to be evaluated.

4. Apparatus as defined in claim 3, wherein all of said electronic circuit means are connected in parallel with each other and are all commonly connected to said scanning means, whereby the latter is utilized to provide information regarding the recordings to all of said electronic circuit means.

5. Apparatus as defined in claim 1, wherein said scanning means comprises a plurality of photo-sensors, the later being arranged adjacent to one another in a straight row in a direction perpendicular to the tracks, and the length of said row having a dimension greater than any recorded width to be evaluated, whereby each recording is always covered by at least some of said sensors.

6. Apparatus as defined in claim 2, wherein said recordings include wide and narrow beam recordings and wherein one of said electronic circuit means comprises an electronic circuit for recognizing the wide beam recordings, an other of said electronic circuit means comprises an other electronic circuit for recognizing the narrow beam recordings, each of said electronic circuit means further comprising a plurality of counters each of which is connected to a respective electronic circuit, said time pulses being transmitted to a respective counter connected to one of said electronic circuits only in response to recognition of a corresponding beam recording by the latter to thereby record the total time the respective beam recordings are recognized.

7. Apparatus as defined in claim 6, wherein said scanning means comprises a plurality of photo-sensors arranged in predetermined positions relative to the tracks and controllable by said beams, said electronic circuits including means for differentiating between wide and narrow beams in response to detection of said beams by said photo-sensors, such differentiation being dependent on the number and relative positions of the controlled photo-sensors.

8. Apparatus as defined in claim 1, wherein said recordings include a sawtooth type recording, and wherein one of said electronic circuit means comprises an electronic circuit for recognizing the sawtooth type recording, said electronic circuit generating a signal at each occurrence of a peak on said recording; and a counter connected to said electronic circuit for counting the number of peaks on said recording.

9. Apparatus as defined in claim 8, wherein said scanning means comprises a plurality of photo-sensors, arranged in a row, the two end photo-sensors being utilized to recognize said peaks and transmitting initiating signals to said electronic circuit.

10. Apparatus as defined in claim 6, further comprising first gate means connected between said one electronic circuit and its respective counter; second gate means connected between said other electronic circuit and its respective counter; standing counter means for counting the total time during which no time pulses are received by said former counters connected to said one and other electronic circuits; and third gate means connected to said standing counter means and having two inputs which are respectively connected to said first and second gate means, said generator means being connected to all said gate means for providing said time pulses thereto, said third gate means being enabled to transmit said time pulses to said standing counter means only when neither said first gate means and said second gate means connected to said electronic circuits transmit said time pulses to said respective counters.

11. Apparatus as defined in claim 1, wherein the diagram chart is a tachograph chart having a first recording to indicate the driving condition of a vehicle and a second recording to indicate the off condition of the latter, and wherein at least one of said electronic circuit means comprises a circuit for summing up the total time the vehicle drives from said first recording, and at least one of said electronic circuit means comprises a circuit for summing up the total time the vehicle was in the off condition from said second recording.

12. Apparatus as defined in claim 1, wherein the diagram chart is a tachograph chart having at least one recording to indicate the distance driven by a vehicle, the recording being in the form of a saw tooth type waveform having a plurality of peaks, and wherein at least one of said electronic circuit means comprises a recognition circuit for identifying said peaks from the information transmitted to the latter from said scanning means, and an evaluation circuit connected to said recognition circuit for calculating the total distance driven by the vehicle.

13. Apparatus as defined in claim 1, wherein said scanning station comprises a plurality of photo-sensors, and further comprising an optical lens system interposed between the diagram chart and said photo-sensors and having magnification, whereby said photo-sensors can be arranged in a straight row to sense the different recordings.

14. Apparatus as defined in claim 1, wherein said scanning means is movable in a direction perpendicular to the tracks relative to the diagram chart, to thereby make possible scanning of different tracks by said scanning means.

15. Apparatus as defined in claim 10, wherein said one electronic circuit comprises a plurality of gates interconnected to logically recognize the appearance of a narrow beam recording, said one electronic circuit including an output gate for generating a signal to said first gate means to thereby cause said time pulses too pass through the latter to the counter connected to said one electronic circuit.

16. Apparatus as defined in claim 15, wherein said gates are NAND-gates.

17. Apparatus as defined in claim 10, wherein said other electronic circuit comprises a plurality of gates connected to logically recognize the appearance of a wide recording, said other electronic circuit including an output gate for generating a signal to said second gate means to thereby cause said time pulses to pass through the latter to the counter connected to said other electronic circuit.

18. Apparatus as defined in claim 17, wherein said output gate is a NOR-gate and the other gates are NAND-gates.

19. Apparatus as defined in claim 12, wherein said recognition circuit comprises a plurality of flip-flops connected to said scanning means and arranged to logically detect preselected points of the sawtooth type waveform, at least two of these points being the peaks of the latter waveform, said flip-flops generating output pulses each time a preselected point is recognized.

20. Apparatus as defined in claim 19, wherein said recognition circuit further comprises a plurality of gates, at least two of the latter being end-gates and the rest including intermediate gates, said end-gates being connected to said flip-flops arranged to detect the peaks, and the intermediate gates being connected to said flip-flops arranged to detect the other predetermined points, said gates being arranged to pass and block the transmission of said output pulses to said evaluation circuit.

21. Apparatus as defined in claim 20, wherein said recognition circuit further comprises a control flip-flop which is connected to said intermediate gate to block the passage of output pulses through the latter after a peak has been detected, whereby thereafter only output pulses pass through said end gates.

22. Apparatus as defined in claim 20, wherein at least some of said gates are connected to said intermediate gates for detecting the states of the flip-flops arranged to detect the other predetermined points, said at least some of said gates ascertaining said states of said latter flip-flops in response to the detection of the last peak of the recording, whereby said evaluation circuit can increase the accuracy of the total distance evaluation.

23. Apparatus as defined in claim 8, wherein said electronic circuit includes means for transmitting signals to said counter while recognizing said recording between two adjacent peaks.

24. Apparatus as defined in claim 8, wherein said sawtooth type recording may have parts before the first peak and after the last peak, and said electronic circuit including means for generating signals in response to recognition of said recording parts, to thereby increase the accuracy of the distance evaluation.

25. Apparatus as defined in claim 8, wherein said scanning means comprises a plurality of sensors which individually generate pulses when recognizing a sawtooth recording, further comprising an intermediate counter connected between said electronic circuit and said counter, said intermediate counter having a limited capacity to count a predetermined number of pulses which is equal to the number of pulses generated by said sensors between two peaks, whereby when said intermediate counter exceeds said predetermined count, the latter generates an error recognition signal.

* * * * *